United States Patent Office 3,594,315
Patented July 20, 1971

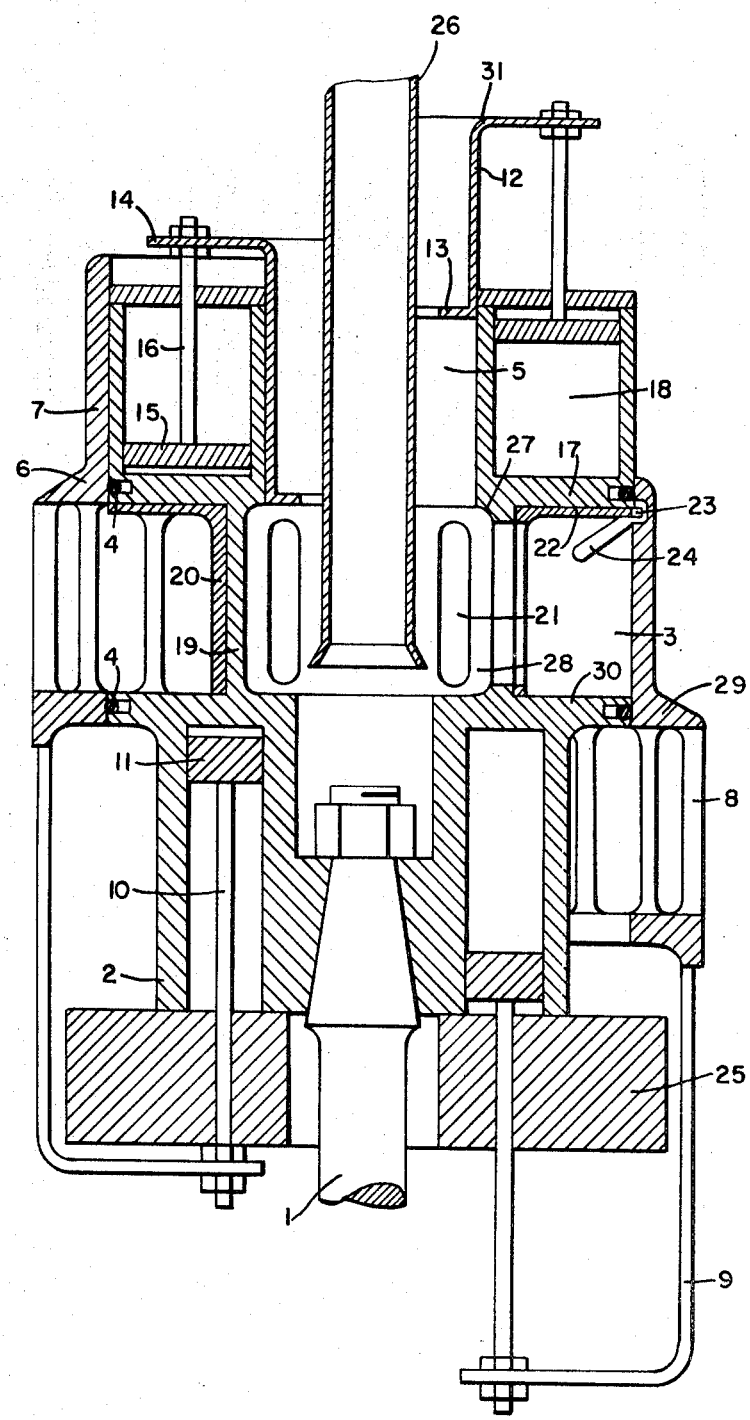

3,594,315
PROCESS FOR THE SEPARATION OF SOLIDS FROM A LIQUID BY MEANS OF AN ARTIFICIAL GRAVITATIONAL FIELD
Eberhard Otto Gert Buban, Munich-Allach, Germany, assignor to N.V. Motorenfabriek Thomassen, De Steeg, Netherlands
Continuation of application Ser. No. 496,737, Sept. 30, 1965. This application May 5, 1969, Ser. No. 821,974
Int. Cl. B01d 37/00
U.S. Cl. 210—73                    4 Claims

ABSTRACT OF THE DISCLOSURE

This invention is directed to a process for separating solids from a liquid, by way of example in purifying sewage waters and settling sludges by the use firstly of an artificial gravitational field and secondly a natural gravitational field while periodically removing sediments after interrupting the supply of the liquid to be purified.

---

The present invention relates to a Process for the Separation of Solids From a Liquid by Means of an Artificial Gravitational Field, and is a continuation of my similarly entitled U.S. application, Ser. No. 496,737, filed Sept. 30, 1965, and now abandoned.

An object of the present invention is to provide a process for separating solids from a liquid, more especially for purifying sewage waters and settling sludges, by combination of an artificial and a natural sedimentation, the liquid to be purified being supplied to an artificial gravitational field and thereafter to a nautral gravitational field, while periodically the sediments are removed, after interrupting the supply of the liquid to be purified.

The liquid to be clarified or filtered, hereinafter referred to as the "influx," enters an artificial gravitational field at one end thereof. The clarified or filtered liquid, hereinafter referred to as "overflow," discharges at the other end of the artificial gravitational field, the deposited solids, hereinafter referred to as "sediment" or "cake," are periodically removed from the artificial gravitational field.

Such process operates very satisfactorily, as long as the solid contained in the influx is comparatively coarse or has a comparatively high specific gravity. They have also proved satisfactory in all those cases where the important feature is to obtain a cake which is as dry as possible, as for example in the chemical industry. The overflow with a very high solid content can then always be returned in circulation to the purifying system.

A further object of the present invention is that by increasing the multiple of the acceleration of gravity (centrifugal force) within an artificial gravitational field, the cleaning effect on the liquid to be clarifield increases. However, this applies exclusively in respect of static conditions in the artificial gravitational field, i.e. when the liquid to be clarified is influenced mainly by the acceleration multiple. On strictly economic grounds, it is however unavoidable when using these systems in practice that, during the sedimentation process, liquid which is to be purified is continuously fed to the artificial gravitational field, and the clarified overflow likewise discharges continuously from the said field. In this way, the artificial gravitational field, differing from the sedimentation direction of the solids during the sedimentation time, is continuously traversed. Depending on the flow intensity, the solid particle to be deposited is deflected from the sedimentation direction or is even carried forward without being able to be deposited. In this case, of the solid particle to be deposited is very small or of colloidal nature, which is the characteristic of sewage waters and settling sludges, a relatively low flow intensity is already sufficient in order to prevent the sedimentation.

The manner in which the influx is supplied to the artificial gravitational field also influences the entire flow path after the influx zone. This is all the more applicable when this zone contains a quantity of colloids, the substance of which is neither solid nor liquid, but as it were comprises the power of both. According to the experience, this latent power as with all supports of vegetative processes, also in the settling sludge, is very sensitive to external mechanical effects such as beating or impact.

A further object of the invention is to achieve an extensive sedimentation, even of the fine solid particles, by striving for almost stationery conditions, that is to say, by keeping the liquid as static as possible and by disturbing this liquid as little as possible by forces which do no exclusively promote the sedimentation.

With the foregoing and other objects in view, the invention will be more fully described hereinafter, and will be more particularly pointed out in the claims appended hereto.

In the drawing, wherein like symbols refer to like or corresponding parts:

The figure is a vertical sectional view through an apparatus employed in performing the process of the instant invention.

According to the present invention, there is provided a process for separating solids from a liquid, more especially for purifying sewage waters and settling sludges by combination of an artificial sedimentation and natural sedimentation. The liquid to be purified is supplied to an artificial gravitational field whereafter the purified liquid is discharged herefrom into a natural gravitational field, while the sediments are removed after interrupting the supply of the liquid to be purified. The quantity of the liquid to be purified and supplied per unit of time to the artificial gravitational field and the acceleration multiple is so limited and the area and depth of the artificial gravitational field is so formed that all forces disturbing the sedimentation, more especially those produced by the flow through the artificial gravitational field, are kept within such limits that the sedimentation takes place in an almost static artificial gravitational field, so that even those ultra fine solid particles which are difficult to deposit can still be deposited before leaving the artificial gravitational field without being stirred up or even washed out. The liquid to be purified further is caused to enter into the artificial gravitational field as far as possible without disturbance, so that there is formed therein a flow path such that the natural state of aggregation of the solid or colloidal solid materials contained in the liquid to be clarified is not destroyed. A number of deposition regions of first of all relatively coarse and then finer solids are set up in the artificial gravitational field, the said regions being sequentially disposed and merging one into the other, in such a way that the solid content of the discharging liquid is smaller than its possible characteristic boundary value, connected with the aeration thereof. Coagulation of the solids still contained in said liquid occurs when this value is not reached, whereas they are foamed up to a coherent floating layer when this value is exceeded.

By maintaining the conditions set forth above, and especially by controlling the flow and an adequate residence time, the solids are successively deposited, initially of relatively coarse structure, followed by solids of the fine and ultra structure.

The dimensions of the inner boundary surface of the artificial gravitational field must be such that the residence time of the liquid is sufficiently long when maintaining the aforementioned limitation of the velocity of the liquid to be clarified, that all solid particles within the sedimentation zone always find the deposition range which corresponds to their structure, and that the overflow is purified to its maximum extent.

The depth of the artificial gravitational field is to be of such dimensions that with little depth, the flow at the surface does not again stir up the deposited fine substances, but with excessive depth the sediments are not dried to their maximum extent.

The supplied influx causes a displacement of the purified liquid, which is discharged in proportion to the quantity of liquid supplied. When the space of the artificial field is filled with deposited solids, steps can be taken for discharging these substances while maintaining the acceleration multiple, after stopping the influx.

When the process according to the invention is used for purifying sewage waters and settling sludges, a further object of the invention is to limit the acceleration multiple in the artificial gravitational field to a value which does not appreciably exceed 400 g. and to restrict the solid content of the overflow discharging from the artificial gravitational field to about 1 percent.

The comparatively low value of the acceleration multiple and thus the keeping down of all forces which have a disturbing effect on the pure sedimentation has proven to be a decisive factor for the purification of fine sludges, but especially wth sewage waters and settling sludges with the requirement for optimum overflow quality.

The same restricted value of the acceleration multiple is also of essential importance for the discharge of the cake. With a usual value in the known processes, the frictional forces are so high that the discharge can no longer be achieved on constructional grounds. The wear becomes untenable, whereas uncontrollable displacements of equilibrium can be produced.

The method further employs the kinetic energy of the overflow discharging from the artificial gravitational field, so as to physically influence this overflow more especially by aeration. This produces coagulation of the solids still contained in the overflow of the artificial gravitational field, thus enabling a subsequent sedimentation of these coagulated solids in a natural gravitational field.

Experience has shown that the process according to the invention is the first process which is able to achieve the necessary low value of the solid content in the overflow by the use of an artificial gravitational field and makes possible the coagulation of the solids of the overflow in the natural gravitational field by the aeration of the overflow.

A fact which is of extraordinary importance in this connection is that the solids flocculated out from the overflow are now able to form a sediment in the natural and/or artificial gravitational field, for example, due to a return of the overflow either directly to the influx of the artificial gravitational field, or to a preliminary stage constituted by a natural gravitational field.

By utilizing the kinetic energy of the artificial gravitational field, there is an optimum introduction of air into the overflow on the discharge thereof, for example, of the order of 90 percent of the saturation value with sewage waters and settling sludges.

The method further provides for interruption of the influx and the commencement of the expulsion in the artificial gravitational field by a previously adjustable limiting value of the contamination of the overflow. This can be effected by optical, electrical, electrolytic or mechanical means.

An apparatus for carrying the process into effect could for example be based on the machine disclosed in German Pat. 1,048,831 to Eberhard Buban, because the essential elements are basically contained in said machine.

One form of apparatus for practicing the process of the present invention is shown in the drawing in which the device comprises a driving shaft 1 with a hollow body 2 containing a first chamber 3 and a second chamber 5.

The chamber 3 has an intermediate wall 19 with big openings 21, which might be closed by a skirt 20. The chamber 3 has an outer wall 7 capable of being raised and lowered by means of rods 9 and 10 and a piston 11. The left-hand side of the drawing belonging to the German patent shows the raised position whilst the right-hand side shows the lowered position, in which the chamber 3 is closed. The wall 7 has a groove 24 cooperating with a projection 23 on the circumference of a disc 22 connected to the skirt 20, such that this skirt is turned over a limited arc during the first part of the raising movement and the last part of the lowering movement of the wall 7. The skirt 20 shows the same kind of apertures as the openings 21 in the intermediate wall 19. In the position represented on the left-hand side of the drawing the skirt 20 closes the perforated intermediate wall 19, whilst on the right-hand side the openings 21 are free. In the second chamber 5 there is an edge 13 connected to a cylinder 12 with an upper flange 31. The edge 13 is capable of being raised and lowered by means of rods 16 and a piston 15. Finally there is a central feed tube 26 for the liquid to be purified.

As an example the following dimensions and values can be given:

Diameter of chamber 5=24"
Height of chambers 3 plus 5=60"
Feed rate of liquid=45 gallon/h.
R.p.m. of shaft 1=400

In the particular embodiment disclosed in the German Pat. No. 1,048,831 the discharge of the settled solids or cake takes place in a rather unconventional way, in that the patentee aims at realizing an uninterrupted service of his device by pushing the solids from chamber 5 by means of the edge 13 into the chamber 3. Thereupon the intermediate wall 19 is closed immediately followed by a raising of the wall 7 so that the cake is thrown outwardly.

What I claim is:

1. The process of separating solids from a liquid, more especially for purifying sewage waters and settling sludges by firstly subjecting the liquid to be purified to an artificial gravitational field of the order of 400 g., causing sedimentation to take place in a number of deposition regions of relatively coarse and then finer solids, periodically discharging the sediments after interrupting the supply of the liquid to the artificial gravitational field, limiting the supply of the liquid such that the percentage of impurities in the overflow of the artificial gravitational field remains under a boundary value, aerating the overflow of said artificial gravitational field, flocculating the said impurities after aeration, atomizing the liquid discharged from the artificial gravitational field and introducing the liquid thus aerated into a natural gravitational field for flocculation and subsequent sedimentation of the resulting coagulated solids in a natural gravitational field.

2. The method of claim 1 further comprising the step of supplying the sediment from the natural gravitational field to the influx of the artificial gravitational field to be added to the sediments thereof.

3. The method of claim 1 further comprising subjecting the liquid to be purified to a natural gravitational field prior to its introduction into the artificial gravitational field.

4. A process as claimed in claim 1 in which the interruption of the influx and the commencement of the discharge of the sedimented solids in the artificial gravitational field takes place on reaching a previously adjustable limiting value of the dirtying of the overflow.

References Cited

UNITED STATES PATENTS 1,915,240    6/1933    Putnam  _____ 210—78X

J. L. DECESARE, Primary Examiner